(12) United States Patent
Watanabe et al.

(10) Patent No.: US 8,536,111 B2
(45) Date of Patent: Sep. 17, 2013

(54) HYDROPHILICITY-RESTORING AGENT AND METHOD FOR RESTORING HYDROPHILICITY

(75) Inventors: Akina Watanabe, Fujieda (JP); Masatoshi Nakamura, Fujieda (JP)

(73) Assignee: Murakami Corporation, Shizuoka (JP)

( * ) Notice: Subject to any disclaimer, the term of this patent is extended or adjusted under 35 U.S.C. 154(b) by 348 days.

(21) Appl. No.: 12/724,502

(22) Filed: Mar. 16, 2010

(65) Prior Publication Data

US 2010/0300488 A1 Dec. 2, 2010

(30) Foreign Application Priority Data

May 29, 2009 (JP) ................................. 2009-130127

(51) Int. Cl.
*C11D 7/22* (2006.01)
*C11D 7/24* (2006.01)
*C11D 7/26* (2006.01)

(52) U.S. Cl.
USPC ........... 510/473; 510/470; 510/471; 510/474; 510/477; 510/488; 510/499

(58) Field of Classification Search
USPC ................. 510/470, 471, 473, 474, 477, 488, 510/499
See application file for complete search history.

(56) References Cited

U.S. PATENT DOCUMENTS

| | | | |
|---|---|---|---|
| 5,594,585 A | 1/1997 | Komatsu | |
| 5,854,708 A | 12/1998 | Komatsu et al. | |
| 6,506,716 B1 * | 1/2003 | Delplancke et al. | 510/336 |
| 7,462,585 B2 * | 12/2008 | Uehara | 510/123 |
| 2002/0173435 A1 * | 11/2002 | Librizzi | 510/130 |
| 2003/0144170 A1 * | 7/2003 | Arvanitidou et al. | 510/424 |
| 2004/0067861 A1 * | 4/2004 | Denome et al. | 510/221 |
| 2005/0054547 A1 * | 3/2005 | Ganopolsky et al. | 510/130 |
| 2007/0289614 A1 * | 12/2007 | McDonnell et al. | 134/42 |
| 2010/0323941 A1 * | 12/2010 | Vlahakis et al. | 510/226 |

FOREIGN PATENT DOCUMENTS

| | | |
|---|---|---|
| CN | 1482223 A | 3/2004 |
| JP | 8-11631 | 1/1996 |
| JP | 10-36144 | 2/1998 |
| JP | 3684913 | 10/2000 |
| WO | 83/03621 A1 | 10/1983 |

OTHER PUBLICATIONS

Chinese Office Action issued with respect to patent family member Chinese Patent App. No. 201010188668.5, dated Aug. 27, 2012, along with an English-language translation.
Liang Zhiqi et al., "The *Practical Manual of Cleaning Technologies,*" Chemical Industry Press, Jun. 30, 2005, pp. 16, 124-126.
Chinese Office Action and Search Report issued with respect to patent family member Chinese Patent App. No. 201010188668.5 dated Jan. 25, 2013, along with an English language translation.
English language Abstract of JP 2000-303055, corresponding to JP 3684913, Oct. 31, 2000.

\* cited by examiner

*Primary Examiner* — Gregory Delcotto
(74) *Attorney, Agent, or Firm* — Greenblum & Bernstein, P.L.C.

(57) ABSTRACT

The present invention provides a hydrophilicity-restoring agent for removing inorganic matter from a hydrophilic surface whose hydrophilicity has been reduced by the adhesion of the inorganic matter to thereby restore the hydrophilicity of the hydrophilic surface, and provides a method for restoring the hydrophilicity of a hydrophilic surface using the hydrophilicity-restoring agent. A gel of a hydrophilicity-restoring agent is prepared by mixing a thickener such as polyethylene glycol and xanthan gum with an aqueous solution in which a ligand such as citric acid to form a chelate complex is dissolved. The hydrophilicity of the hydrophilic surface is restored by applying the hydrophilicity-restoring agent to the hydrophilic surface with a reduced hydrophilicity and removing the hydrophilicity-restoring agent after an appropriate lapse of time.

20 Claims, 4 Drawing Sheets

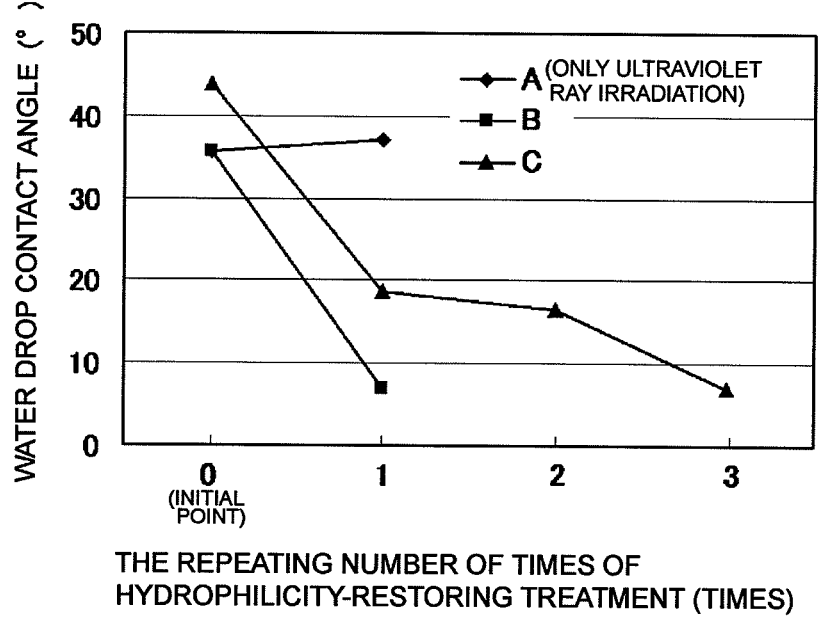
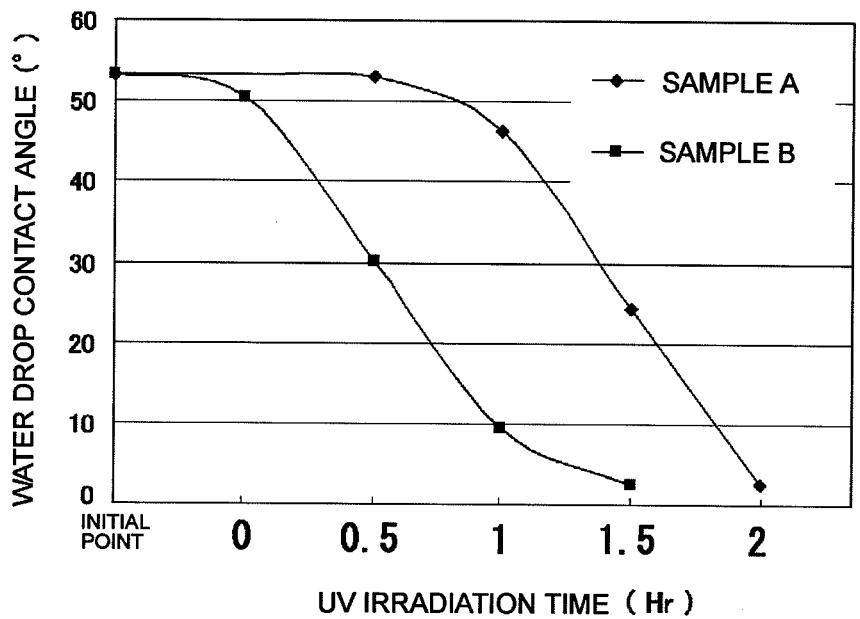

HYDROPHILICITY-RESTORING AGENT AND METHOD FOR RESTORING HYDROPHILICITY

The disclosure of Japanese Patent Application No. JP2009-130127 filed on May 29, 2009 including the specification, drawings, claims and abstract is incorporated herein by reference in its entirety.

BACKGROUND OF THE INVENTION

1. Field of the Invention

The present invention relates to a hydrophilicity-restoring agent for removing inorganic matter from a hydrophilic surface such as a hydrophilic film whose hydrophilicity has been reduced by the adhesion of the inorganic matter to thereby restore the hydrophilicity of the hydrophilic surface, and to a method for restoring the hydrophilicity of a hydrophilic surface using the hydrophilicity-restoring agent.

2. Description of the Related Art

Japanese Patent Laid-Open Nos. 8-11631 and 10-036144 describe an anti-fog element such as a mirror for vehicles which has anti-fog properties by making its surface hydrophilic. The anti-fog element described in Japanese Patent Laid-Open No. 8-11631 is obtained by forming a hydrophilic oxide film of porous $SiO_2$ or the like on a substrate surface. The anti-fog element described in Japanese Patent Laid-Open No. 10-036144 is obtained by forming a photocatalyst film of $TiO_2$ or the like on a substrate surface and subsequently forming a hydrophilic oxide film of porous $SiO_2$ or the like thereon.

The hydrophilicity of an anti-fog element is gradually reduced during its use by the adhesion of organic and inorganic matter to the hydrophilic surface. In particular, when the surface is a porous hydrophilic surface, organic and inorganic matter are liable to adhere thereto. Organic stains can be removed by utilizing photocatalyst function described in Japanese Patent Laid-Open No. 10-036144 or a surfactant described in Japanese Patent No. 3684913 or the like, but inorganic stains cannot be removed either by photocatalyst function or a surfactant. In particular, when the surface is a porous hydrophilic surface, inorganic stains enter into the pores, making it difficult to remove the stains. Further, if the inorganic stains are to be removed by strong acid, polishing, or the like, the hydrophilic surface will be damaged.

The present invention has been made in the light of the above-described problems. Accordingly, it is the object of the present invention to provide a hydrophilicity-restoring agent for removing inorganic matter from a hydrophilic surface whose hydrophilicity has been reduced by the adhesion of the inorganic matter to thereby restore the hydrophilicity of the hydrophilic surface, and to provide a method for restoring the hydrophilicity of a hydrophilic surface using the hydrophilicity-restoring agent.

SUMMARY OF THE INVENTION

The hydrophilicity-restoring agent of the present invention comprises a gel obtained by mixing a thickener into an aqueous solution in which a ligand capable of forming chelate complexes is dissolved. This hydrophilicity-restoring agent can remove inorganic matter adhering to a hydrophilic surface to thereby restore the hydrophilicity of the hydrophilic surface by the chelating effect of the ligand capable of forming chelate complexes. Particularly, since the hydrophilicity-restoring agent of the present invention comprises a gel, a good inorganics-removing effect is obtained. Specifically, since the hydrophilic surface with a reduced hydrophilicity has water repellency, if the hydrophilicity-restoring agent is a non-gel aqueous solution, it will aggregate in an island form when it is applied to the surface and a part thereof may flow down from the hydrophilic surface. As a result, it is impossible to uniformly remove the inorganic matter adhering to the hydrophilic surface. Further, if the hydrophilicity-restoring agent is a non-gel aqueous solution, it will easily volatilize while it is allowed to stand after application, resulting in reduction in inorganics-removing effect. On the other hand, since the hydrophilicity-restoring agent of the present invention comprises a gel, the hydrophilicity-restoring agent hardly aggregates in an island form even if a hydrophilic surface is water-repellent due to the reduction in hydrophilicity of the hydrophilic surface, which allows uniform removal of the inorganic matter adhering to the hydrophilic surface. Further, since the hydrophilicity-restoring agent is gel, it is hard to volatilize, and an expected inorganics-removing effect is obtained. Therefore, the hydrophilicity-restoring agent of the present invention allows a hydrophilicity-restoring treatment in which the hydrophilicity-restoring agent can stay only on the hydrophilic surface of a member to be treated. Thus, it is possible to perform hydrophilicity-restoring treatment with good workability even for a member to be treated that cannot be immersed in an aqueous solution of the hydrophilicity-restoring agent.

In the hydrophilicity-restoring agent of the present invention, the ligand capable of forming chelate complexes may be at least one ligand selected from the group consisting of ascorbic acid, iminodiacetic acid, ethylenediamine, EDTA (ethylene diamine tetraacetic acid), citric acid, gluconic acid, nitrilotriacetic acid, HIDS (hydroxyiminodisuccinic acid), malic acid, and phosphoric acid. Particularly, ascorbic acid, EDTA, citric acid, gluconic acid, and malic acid are harmless to human body, and harmless also to various hydrophilic materials. They are also harmless even when directly applied to a coating material or resin. The above thickener may be at least one thickener selected from the group consisting of polyethylene glycol, pectin, xanthan gum, potato starch, agar, carrageenan, sodium carboxymethylcellulose, guar gum, locust bean gum, tara gum, glucomannan, psyllium seed gum, tamarind seed gum, gum arabic, arabinogalactan, pullulan, welan gum, enzymatically hydrolyzed guar gum, artemisia sphaerocephala seed gum, gellan gum, dextran, Hibiscus manihot (Abelmoschus manihot or Tororo-aoi in Japanese), and levan. The thickeners as described above are harmless to human body and various hydrophilic materials, and are also harmless even when directly applied to a coating material or resin.

In the hydrophilicity-restoring agent of the present invention, the concentration of the ligand capable of forming chelate complexes may be in the range of, for example, from 5 to 50% by weight based on the total amount of the composition forming the hydrophilicity-restoring agent. In contrast, if the concentration is less than 5% by weight, the inorganics-removing effect may not sufficiently be exhibited, and if it is more than 50% by weight, the hydrophilicity-restoring agent may not sufficiently be dissolved. More preferably, the concentration may be in the range of from 15 to 40% by weight.

The hydrophilicity-restoring agent of the present invention may have a viscosity, for instance, in the range of from 1 to 160 cP at 25° C. In contrast, if the viscosity is lower than 1 cP, the hydrophilicity-restoring agent may be easily dripped from the hydrophilic surface to be treated, and if it is higher than 160 cP, the amount of the thickener will be increased to prevent the ligand capable of forming chelate complexes from effectively acting on the inorganic matter on the hydrophilic surface, resulting in reduction in the inorganics-removing effect.

A method for restoring hydrophilicity of the present invention comprises applying a hydrophilicity-restoring agent of the present invention to a hydrophilic surface such as a hydrophilic inorganic oxide film with a reduced hydrophilicity and removing the hydrophilicity-restoring agent after an appropriate lapse of time to restore hydrophilicity of the hydrophilic surface. In the method for restoring hydrophilicity, it is possible to further cover the surface to which the hydrophilicity-restoring agent is applied with a plastic film during the appropriate lapse of time. By covering with a plastic film, an aggregation and volatilization of the hydrophilicity-restoring agent can be suppressed more effectively to thereby provide a uniform hydrophilicity-restoring effect over the whole hydrophilic surface.

In the method for restoring hydrophilicity of the present invention, when the hydrophilic surface is one having an organics-decomposing function by a photocatalyst, the hydrophilicity-restoring agent is removed; the hydrophilic surface is then irradiated with ultraviolet rays for an appropriate period of time to undergo organics decomposition treatment; a hydrophilicity restoration level is observed after the organics decomposition treatment; and if hydrophilicity is not restored to a target level, a series of steps including: application of the hydrophilicity-restoring agent; removal of the hydrophilicity-restoring agent after an appropriate lapse of time; irradiation with ultraviolet rays; and observation of a hydrophilicity restoration level can be repeated until the hydrophilicity is restored to the target level. According to this method, the hydrophilicity can be restored even when the adhesion strength of inorganic matter is high or the adhesion amount thereof is large by repeating the treatment by the number of times depending on the adhesion strength of inorganic matter and the adhesion amount thereof. The hydrophilicity can be restored by a small number of times (for example, 1 time) when the adhesion strength of inorganic matter is low or when the adhesion amount is small. Therefore, the hydrophilicity-restoring treatment can be completed in a short time.

BRIEF DESCRIPTION OF THE DRAWINGS

FIG. 7 is a chart showing experimental results of experiments to verify hydrophilicity-restoring effect using a hydrophilicity-restoring agent of Embodiment 3; and FIG. 8 is a chart showing experimental results of experiments to verify organics-removing/reducing effect using a hydrophilicity-restoring agent of Embodiment 3.

DETAILED DESCRIPTION OF THE PREFERRED EMBODIMENTS

Embodiment 1

Figure 1:
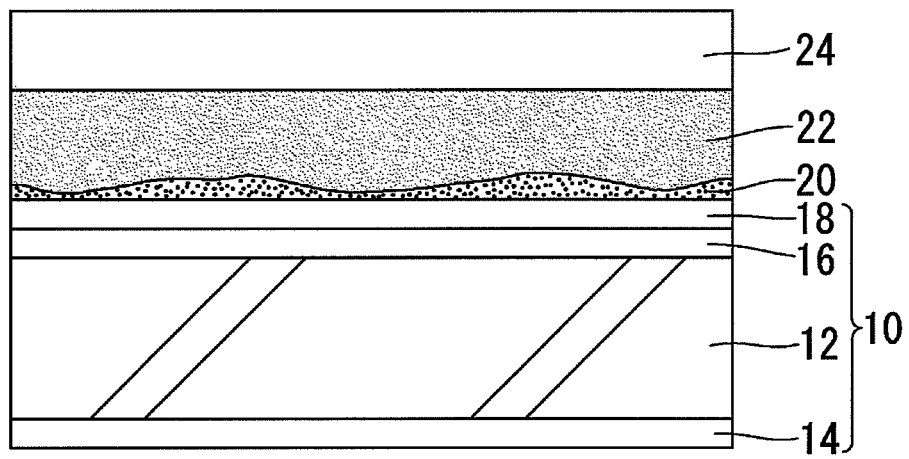
FIG. 1 is a schematic sectional view showing the state where hydrophilicity-restoring treatment is performed by applying a hydrophilicity-restoring agent to a hydrophilic mirror for vehicles to the surface of which an inorganic stain has adhered.

Embodiment 1 of the present invention will be described.
<Materials Provided for Preparing a Hydrophilicity-Restoring Agent>
Citric acid (ligand capable of forming chelate complexes): 30 wt %
Polyethylene glycol (thickener): 30 wt %
Water: 40 wt %
<Preparation of a Hydrophilicity-Restoring Agent>
Polyethylene glycol was mixed with water, and citric acid was dissolved in the resulting mixture to prepare a gel of a hydrophilicity-restoring agent. The prepared gel had a viscosity at 25° C. of from 10 to 15 cP. Note that citric acid may be dissolved in water before polyethylene glycol is mixed with water.
<Hydrophilicity-Restoring Treatment>
The hydrophilicity-restoring agent prepared as described above is applied to the surface of a hydrophilic mirror for vehicles to which an inorganic stain has adhered to thereby remove the inorganic stain by the chelating effect of citric acid. FIG. 1 schematically shows a section structure in the state where a hydrophilicity-restoring agent 22 prepared as described above is applied to a hydrophilic mirror 10 for vehicles to the surface of which an inorganic stain 20 (such as calcium) has adhered, and the hydrophilicity-restoring agent is further covered with a plastic film 24. This mirror 10 constitutes the mirror surface part of an outer mirror such as a door mirror. The mirror 10 comprises a glass substrate 12, a metallic reflection film 14 formed on the back surface side of the glass substrate, a $TiO_2$ photocatalyst film 16 formed on the front surface side of the glass substrate as a photocatalyst film, and a porous $SiO_2$ hydrophilic oxide film 18 formed on the photocatalyst film as a hydrophilic film. In the state where a stain has not adhered to the surface of the mirror 10, water adhering to the surface of the mirror 10 spreads in the shape of a thin film by the hydrophilicity of the hydrophilic oxide film 18 without forming waterdrops. Thus, the visibility in the case of rainy weather is ensured. When an organic stain and an inorganic stain 20 adhere to the surface of the mirror 10, the hydrophilicity of the mirror will be reduced. Among these stains, the organic stain can be decomposed and reduced by the photocatalytic effect of the photocatalyst film 16. On the other hand, the inorganic stain 20 cannot be removed by the photocatalytic effect of the photocatalyst film 16. Therefore, a treatment is performed in which the inorganic stain 20 is removed by using a hydrophilicity-restoring agent to thereby restore hydrophilicity. In this case, if the mirror 10 is immersed in an aqueous solution of a hydrophilicity-restoring agent to perform hydrophilicity-restoring treatment, there is a possibility of damaging a member arranged at the back surface side of the mirror 10, such as an adhesive tape and a heater. Therefore, the hydrophilicity-restoring treatment is herein performed by applying a gel of the hydrophilicity-restoring agent 22 to the surface (front surface side) of the mirror 10. When the hydrophilicity-restoring agent 22 has a low viscosity, the hydrophilicity-restoring agent 22 may gradually run downward while the hydrophilicity-restoring agent 22 is allowed to stand after it is applied to the surface of the mirror 10, if the hydrophilicity-restoring treatment is performed in the state where the mirror 10 is mounted on a door mirror main body with the mirror in a perpendicular position. Therefore, in such a case, it is desirable to remove the mirror 10 from the door mirror main body and perform the hydrophilicity-restoring treatment with the mirror in a horizontal position.

The sequence of operations of the hydrophilicity-restoring treatment will be described below.

(1) As shown in FIG. 1, the hydrophilicity-restoring agent 22 is applied to the entire surface (front surface side) of the mirror 10 to cover the entire surface with the hydrophilicity-restoring agent 22.

(2) As shown in FIG. 1, the applied hydrophilicity-restoring agent 22 all over the mirror 10 is optionally covered with the plastic film 24 such as a wrapping film for foodstuffs (food plastic wrap). This can more effectively suppress the occurrence of unevenness in an inorganic stain-removing caused by aggregation of the hydrophilicity-restoring agent 22 in an island form or flowing down of a portion of the hydrophilicity-restoring agent from the hydrophilic surface, and the reduction in the inorganic stain-removing effect caused by volatilization of the hydrophilicity-restoring agent 22, in the following step of allowing the mirror to stand.

(3) The mirror 10 is placed on a horizontal table and is allowed to stand for an appropriate period of time (for example, for 20 minutes). During this step of allowing the mirror to stand, citric acid combines with the inorganic stain to form a chelate complex such as calcium citrate (chelating effect) to remove the inorganic stain from the surface of the mirror 10.

(4) The plastic film 24 is removed, and the hydrophilicity-restoring agent 22 on the surface of the mirror 10 is removed by washing it away with water.

(5) When the hydrophilicity-restoring agent 22 cannot be sufficiently removed only by washing it away with water due to a thickener component contained in the hydrophilicity-restoring agent 22, an ultraviolet ray lamp or sunlight is used to irradiate the surface of the mirror 10 with ultraviolet rays to decompose the thickener component by the photocatalytic effect to thereby sufficiently remove the hydrophilicity-restoring agent 22.

(6) Water is allowed to adhere to the surface of the mirror 10 to observe the restoration level of hydrophilicity visually or with a contact angle meter.

(7) The hydrophilicity-restoring treatment will be completed when hydrophilicity is restored to a predetermined target level (for example, a waterdrop contact angle reaches below a predetermined target value). On the other hand, when hydrophilicity is not restored to the target level, the steps of (1) to (6) are repeated a plurality of times (a plurality of cycles) until the hydrophilicity is restored to the target level.

<<Hydrophilicity Restoration Experiments Using a Hydrophilicity-Restoring Agent and Hydrophilicity-Restoring Treatment of Embodiment 1>>

<Experiment 1: Experiments to Verify Inorganics-Removing Effect>

Figure 2:
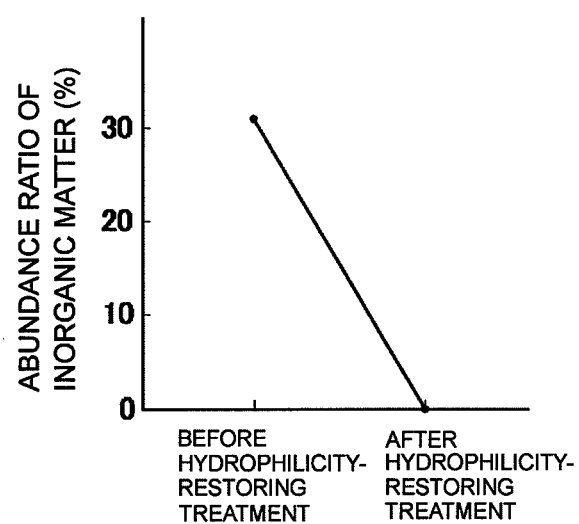
FIG. 2 is a chart showing experimental results of experiments to verify inorganics-removing effect using a hydrophilicity-restoring agent of Embodiment 1.

An inorganic matter was intentionally allowed to adhere to the mirror 10 for vehicles having a section structure as shown in FIG. 1 to prepare a sample. The sample was subjected once (1 cycle) to the hydrophilicity-restoring treatment from step (1) to step (5) using the hydrophilicity-restoring agent of Embodiment 1 (the period of time for allowing to stand in step (3) was set at 20 minutes, and the period of time for ultraviolet irradiation with an ultraviolet ray lamp (irradiation intensity: about 1.0 mW/cm$^2$) in step (5) was set at 6 hours). The adhesion conditions of the inorganic matter were measured before step (1) (in the state where the inorganic matter is intentionally allowed to adhere) and after step (5) (in the state where the ultraviolet irradiation is completed). The adhesion conditions of the inorganic matter were measured by elementary analysis (X-ray photoelectron spectroscopy). Experimental results are shown in FIG. 2. FIG. 2 shows a value of (Ca+Al+Na+Mg)/Si as the abundance ratio of the inorganic matter on the surface of the test sample, where Si is derived from the porous SiO$_2$ hydrophilic oxide film 18 constituting the outermost surface of the mirror 10, and was used as the internal standard for correcting variations in the measurements. Referring to FIG. 2, while the abundance ratio of Ca+Al+Na+Mg to Si before hydrophilicity-restoring treatment was 30% or more, the abundance ratio after the hydrophilicity-restoring treatment was reduced to about 0%, showing that most of the inorganic matter that had adhered to the mirror was removed.

<Experiment 2: Experiments to Verify Hydrophilicity-Restoring Effect>

An inorganic matter was intentionally allowed to adhere to the mirror 10 for vehicles having a section structure as shown in FIG. 1 to prepare a plurality of samples. These samples were subjected to the hydrophilicity-restoring treatment (the period of time for allowing to stand in step (3) was set at 20 minutes, and the period of time for ultraviolet irradiation with an ultraviolet ray lamp (irradiation intensity: about 1.0 mW/cm$^2$) in step (5) was set at 6 hours), and the hydrophilicity-restoring effect was verified. In this experiment, the state of hydrophilicity restoration was verified by measuring the waterdrop contact angle with a contact angle meter. A waterdrop contact angle of 10 degrees or less was regarded as the state where the hydrophilicity has been restored. For a certain sample, adhesion of the inorganic matter is so strong that the waterdrop contact angle did not reach 10 degrees or less, which is the target value, by a single execution of the hydrophilicity-restoring treatment. For such a sample, the hydrophilicity-restoring treatment was repeated until the waterdrop contact angle reaches 10 degrees or less. Further, one sample was subjected only to the ultraviolet irradiation in step (5) without being subjected to the hydrophilicity-restoring treatment, and the hydrophilicity-restoring effect was verified.

Figure 3:
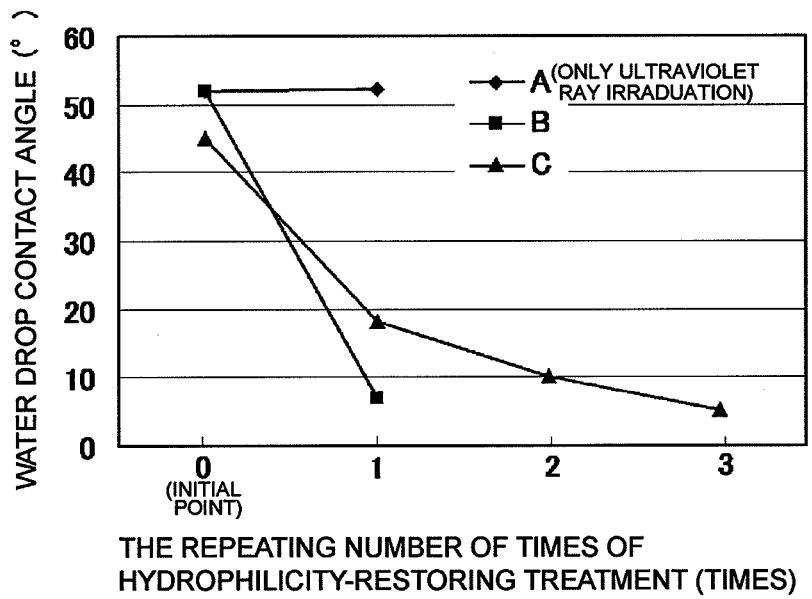
FIG. 3 is a chart showing experimental results of experiments to verify hydrophilicity-restoring effect using a hydrophilicity-restoring agent of Embodiment 1.

Experimental results are shown in FIG. 3. The measurement results A were obtained from a sample which was subjected only to the ultraviolet irradiation (for 6 hours with an ultraviolet ray lamp) without being subjected to the hydrophilicity-restoring treatment. These results show that the inorganic matter is not decomposed and removed only by irradiation with ultraviolet rays. The measurement results B were obtained from a sample which was subjected to the hydrophilicity-restoring treatment once before the waterdrop contact angle reached 10 degrees or less to thereby restore the hydrophilicity. The measurement results C were obtained from a sample which was subjected to the hydrophilicity-restoring treatment 3 times before the waterdrop contact angle reached 10 degrees or less to thereby restore the hydrophilicity. The above results show that the hydrophilicity is restored by performing the hydrophilicity-restoring treatment once or a plurality of times.

<Experiment 3: Experiments to Verify Organics-Removing/Reducing Effect>

It was checked whether or not the hydrophilicity-restoring agent of Embodiment 1 had a removing/reducing effect also on an organic stain. In this experiment, two samples were prepared by intentionally allowing oleic acid as an organic substance to adhere (no intentional adhesion of inorganic matter) to the mirror 10 (having a waterdrop contact angle of 5 degrees or less) for vehicles having a section structure shown in FIG. 1. One of the samples, A, was measured for the waterdrop contact angle, as it is. The other sample, B, was applied with the hydrophilicity-restoring agent of Embodiment 1 and allowed to stand for 20 minutes, and after the allowing to stand, the surface of the mirror 10 was sufficiently rinsed with water to measure the waterdrop contact angle. Subsequently, both samples A and B were simultaneously irradiated with ultraviolet rays, and the waterdrop contact angle was measured every 30 minutes.

Figure 4:
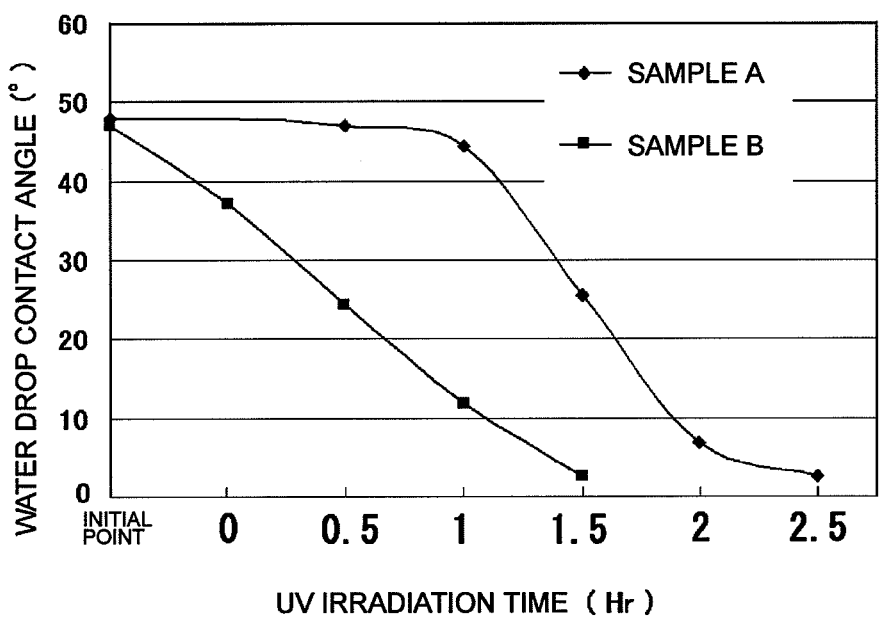
FIG. 4 is a chart showing experimental results of experiments to verify organics-removing/reducing effect using a hydrophilicity-restoring agent of Embodiment 1.

Experimental results are shown in FIG. 4. In FIG. 4, "initial point" refers to the time when oleic acid was intentionally allowed to adhere to the mirror. The sample B was applied with the hydrophilicity-restoring agent as described above, allowed to stand for 20 minutes, and rinsed with water during the time period between the initial point and the time of starting ultraviolet irradiation (the same for the experimental results in FIGS. 6 and 8). Referring to FIG. 4, the sample B having undergone the treatment with the hydrophilicity-restoring agent has restored the hydrophilicity by the ultraviolet irradiation in a shorter time than the sample A which has not undergone the treatment with the hydrophilicity-restoring agent. These results show that the hydrophilicity-restoring agent of Embodiment 1 has a removing/reducing effect also on an organic stain and is effective to restore the hydrophilicity in a short period of time.

Embodiment 2

Embodiment 2 of the present invention will be described. In Embodiment 2, malic acid was used as a ligand capable of forming chelate complexes instead of citric acid used in Embodiment 1.

<Materials Provided for Preparing a Hydrophilicity-Restoring Agent>

Malic acid (ligand capable of forming chelate complexes): 30 wt %
Polyethylene glycol (thickener): 30 wt %
Water: 40 wt %

<Preparation of a Hydrophilicity-Restoring Agent>

Polyethylene glycol was mixed with water, and malic acid was dissolved in the resulting mixture to prepare a gel of a hydrophilicity-restoring agent. The prepared gel had a viscosity at 25° C. of from 10 to 15 cP. Note that malic acid may be dissolved in water before polyethylene glycol is mixed with water.

<Hydrophilicity-Restoring Treatment>

A member having a hydrophilic surface such as a hydrophilic mirror for vehicles, whose hydrophilicity has been reduced by the adhesion of inorganic matter to the hydrophilic surface, can be subjected to the hydrophilicity-restoring treatment having the same steps as in Embodiment 1 using the hydrophilicity-restoring agent prepared as described above to thereby restore the hydrophilicity of the hydrophilic surface.

<<Hydrophilicity Restoration Experiments Using a Hydrophilicity-Restoring Agent and Hydrophilicity-Restoring Treatment of Embodiment 2>>

<Experiment 4: Experiments to Verify Hydrophilicity-Restoring Effect>

An inorganic matter was intentionally allowed to adhere to the mirror 10 for vehicles having a section structure as shown in FIG. 1 to prepare a plurality of samples. These samples were subjected to the hydrophilicity-restoring treatment as described in Embodiment 1 (the period of time for allowing to stand in step (3) was set at 20 minutes, and the period of time for ultraviolet irradiation with an ultraviolet ray lamp (irradiation intensity: about 1.0 mW/cm$^2$) in step (5) was set at 6 hours) using the hydrophilicity-restoring agent in Embodiment 2, and the hydrophilicity-restoring effect was verified. In this experiment, the state of hydrophilicity restoration was verified by measuring the waterdrop contact angle with a contact angle meter. A waterdrop contact angle of 10 degrees or less was regarded as the state where the hydrophilicity has been restored. For a certain sample, adhesion of the inorganic matter is so strong that the waterdrop contact angle did not reach 10 degrees or less, which is the target value, by a single execution of the hydrophilicity-restoring treatment. For such a sample, the hydrophilicity-restoring treatment was repeated until the waterdrop contact angle reaches 10 degrees or less. Further, one sample was subjected only to the ultraviolet irradiation in step (5) without being subjected to the hydrophilicity-restoring treatment, and the hydrophilicity-restoring effect was verified.

Figure 5:
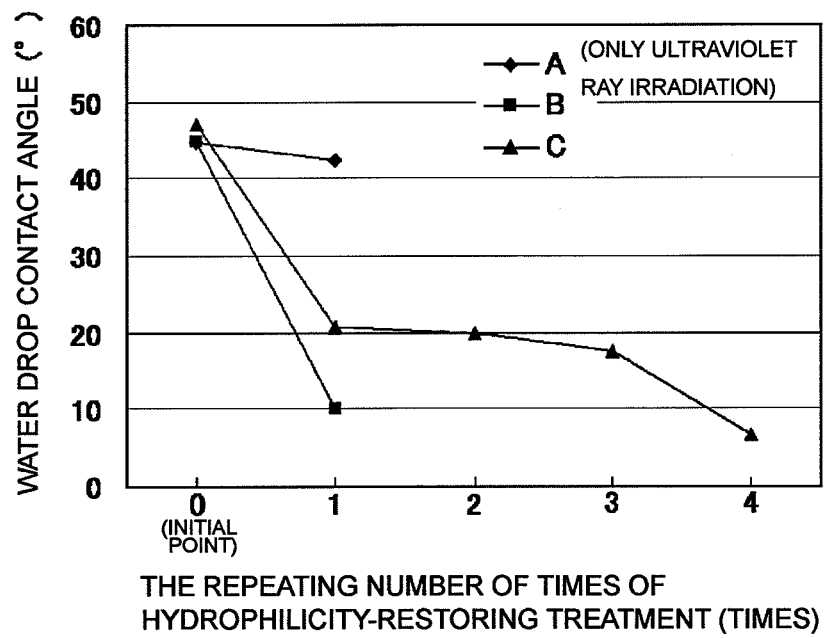
FIG. 5 is a chart showing experimental results of experiments to verify hydrophilicity-restoring effect using a hydrophilicity-restoring agent of Embodiment 2.

Experimental results are shown in FIG. 5. The measurement results A were obtained from a sample which was subjected only to the ultraviolet irradiation (for 6 hours with an ultraviolet ray lamp) without being subjected to the hydrophilicity-restoring treatment. These results show that the inorganic matter is not decomposed and removed only by irradiation with ultraviolet rays. The measurement results B were obtained from a sample which was subjected to the hydrophilicity-restoring treatment once before the waterdrop contact angle reached 10 degrees or less to thereby restore the hydrophilicity. The measurement results C were obtained from a sample which was subjected to the hydrophilicity-restoring treatment 4 times before the waterdrop contact angle reached 10 degrees or less to thereby restore the hydrophilicity. The above results show that the hydrophilicity is restored by performing the hydrophilicity-restoring treatment once or a plurality of times.

<Experiment 5: Experiments to Verify Organics-Removing/Reducing Effect>

It was checked whether or not the hydrophilicity-restoring agent of Embodiment 2 had a removing/reducing effect also on an organic stain. In this experiment, two samples were prepared by intentionally allowing oleic acid as an organic substance to adhere (no intentional adhesion of inorganic matter) to the mirror 10 for vehicles (having a waterdrop contact angle of 5 degrees or less) for vehicles having a section structure shown in FIG. 1. One of the samples, A, was measured for the waterdrop contact angle, as it is. The other sample, B, was applied with the hydrophilicity-restoring agent of Embodiment 2 and allowed to stand for 20 minutes, and after the allowing to stand, the surface of the mirror 10 was sufficiently rinsed with water to measure the waterdrop contact angle. Subsequently, both samples A and B were simultaneously irradiated with ultraviolet rays, and the waterdrop contact angle was measured every 30 minutes.

Figure 6:
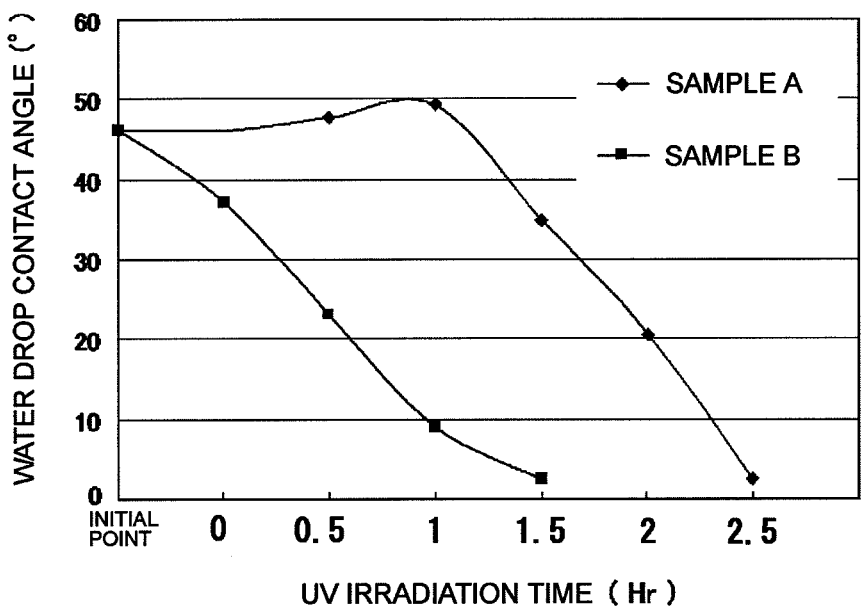
FIG. 6 is a chart showing experimental results of experiments to verify organics-removing/reducing effect using a hydrophilicity-restoring agent of Embodiment 2.

Experimental results are shown in FIG. 6. Referring to FIG. 6, the sample B having undergone the treatment with the hydrophilicity-restoring agent has restored the hydrophilicity by the ultraviolet irradiation in a shorter time than the sample A which has not undergone the treatment with the hydrophilicity-restoring agent. These results show that the hydrophilicity-restoring agent of Embodiment 2 has a removing/reducing effect also on an organic stain and is effective to restore the hydrophilicity in a short period of time.

Embodiment 3

Embodiment 3 of the present invention will be described. In Embodiment 3, xanthan gum was used as a thickener instead of polyethylene glycol used in Embodiment 1.

<Materials Provided for Preparing a Hydrophilicity-Restoring Agent>

Citric acid (ligand capable of forming chelate complexes): 30 wt %

Xanthan gum (thickener): 0.3 wt %

Water: 70 wt %

<Preparation of a Hydrophilicity-Restoring Agent>

Citric acid was dissolved in water to prepare an aqueous citric acid solution. The aqueous citric acid solution was heated and mixed with xanthan gum to prepare a gel of a hydrophilicity-restoring agent. The prepared gel had a viscosity at 25° C. of from 75 to 85 cP.

<Hydrophilicity-Restoring Treatment>

A member having a hydrophilic surface such as a hydrophilic mirror for vehicles, whose hydrophilicity has been reduced by the adhesion of inorganic matter to the hydrophilic surface, can be subjected to the hydrophilicity-restoring treatment having the same steps as in Embodiment 1 using the hydrophilicity-restoring agent prepared as described above to thereby restore the hydrophilicity of the hydrophilic surface.

<<Hydrophilicity Restoration Experiments Using a Hydrophilicity-Restoring Agent and Hydrophilicity-Restoring Treatment of Embodiment 3>>

<Experiment 6: Experiments to Verify Hydrophilicity-Restoring Effect>

An inorganic matter was intentionally allowed to adhere to the mirror 10 for vehicles having a section structure as shown in FIG. 1 to prepare a plurality of samples. These samples were subjected to the hydrophilicity-restoring treatment as described in Embodiment 1 (the period of time for allowing to stand in step (3) was set at 20 minutes, and the period of time for ultraviolet irradiation with an ultraviolet ray lamp (irradiation intensity: about $1.0 \text{ mW/cm}^2$) in step (5) was set at 6 hours) using the hydrophilicity-restoring agent in Embodiment 3, and the hydrophilicity-restoring effect was verified. In this experiment, the state of hydrophilicity restoration was verified by measuring the waterdrop contact angle with a contact angle meter. A waterdrop contact angle of 10 degrees or less was regarded as the state where the hydrophilicity has been restored. For a certain sample, adhesion of the inorganic matter is so strong that the waterdrop contact angle did not reach 10 degrees or less, which is the target value, by a single execution of the hydrophilicity-restoring treatment. For such a sample, the hydrophilicity-restoring treatment was repeated until the waterdrop contact angle reaches 10 degrees or less. Further, one sample was subjected only to the ultraviolet irradiation in step (5) without being subjected to the hydrophilicity-restoring treatment, and the hydrophilicity-restoring effect was verified.

Experimental results are shown in FIG. 7. The measurement results A were obtained from a sample which was subjected only to the ultraviolet irradiation (for 6 hours with an ultraviolet ray lamp) without being subjected to the hydrophilicity-restoring treatment. These results show that the inorganic matter is not decomposed and removed only by irradiation with ultraviolet rays. The measurement results B were obtained from a sample which was subjected to the hydrophilicity-restoring treatment once before the waterdrop contact angle reached 10 degrees or less to thereby restore the hydrophilicity. The measurement results C were obtained from a sample which was subjected to the hydrophilicity-restoring treatment 3 times before the waterdrop contact angle reached 10 degrees or less to thereby restore the hydrophilicity. The above results show that the hydrophilicity is restored by performing the hydrophilicity-restoring treatment once or a plurality of times.

<Experiment 7: Experiments to Verify Organics-Removing/Reducing Effect>

It was checked whether or not the hydrophilicity-restoring agent of Embodiment 3 had a removing/reducing effect also on an organic stain. In this experiment, two samples were prepared by intentionally allowing oleic acid as an organic substance to adhere (no intentional adhesion of inorganic matter) to the mirror 10 for vehicles (having a waterdrop contact angle of 5 degrees or less) having a section structure shown in FIG. 1. One of the samples, A, was measured for the waterdrop contact angle, as it is. The other sample, B, was applied with the hydrophilicity-restoring agent of Embodiment 3 and allowed to stand for 20 minutes, and after the allowing to stand, the surface of the mirror 10 was sufficiently rinsed with water to measure the waterdrop contact angle. Subsequently, both samples A and B were simultaneously irradiated with ultraviolet rays, and the waterdrop contact angle was measured every 30 minutes.

Experimental results are shown in FIG. 8. Referring to FIG. 8, the sample B having undergone the treatment with the hydrophilicity-restoring agent has restored the hydrophilicity by the ultraviolet irradiation in a shorter time than the sample A which has not undergone the treatment with the hydrophilicity-restoring agent. These results show that the hydrophilicity-restoring agent of Embodiment 3 has a removing/reducing effect also on an organic stain and is effective to restore the hydrophilicity in a short period of time.

Note that materials other than those having been used in the above Embodiments 1, 2, and 3 can also be used as a ligand capable of forming chelate complexes and a thickener. Further, the present invention can be applied to not only a member in which a hydrophilic film formed on a substrate constitutes a hydrophilic surface but also a member in which the substrate itself constitutes a hydrophilic surface. Furthermore, the present invention can be applied to the hydrophilicity-restoring treatment of not only a hydrophilic mirror for vehicles but also various members each having a hydrophilic surface.

What is claimed is:

1. A hydrophilicity-restoring agent which is a gel consisting of a thickener, water, and a dissolved ligand capable of forming chelate complexes.

2. The hydrophilicity-restoring agent according to claim 1, wherein the ligand capable of forming chelate complexes is at least one ligand selected from the group consisting of ascorbic acid, iminodiacetic acid, ethylenediamine, EDTA, citric acid, gluconic acid, nitrilotriacetic acid, HIDS, malic acid, and phosphoric acid.

3. The hydrophilicity-restoring agent according to claim 1, wherein the thickener is at least one thickener selected from the group consisting of polyethylene glycol, pectin, xanthan gum, potato starch, agar, carrageenan, sodium carboxymethylcellulose, guar gum, locust bean gum, tara gum, glucomannan, psyllium seed gum, tamarind seed gum, gum arabic, arabinogalactan, pullulan, welan gum, enzymatically hydrolyzed guar gum, artemisia sphaerocephala seed gum, gellan gum, dextran, Hibiscus manihot, and levan.

4. The hydrophilicity-restoring agent according to claim 2, wherein the thickener is at least one thickener selected from the group consisting of polyethylene glycol, pectin, xanthan gum, potato starch, agar, carrageenan, sodium carboxymethylcellulose, guar gum, locust bean gum, tara gum, glucomannan, psyllium seed gum, tamarind seed gum, gum arabic, arabinogalactan, pullulan, welan gum, enzymatically hydrolyzed guar gum, artemisia sphaerocephala seed gum, gellan gum, dextran, Hibiscus manihot, and levan.

5. The hydrophilicity-restoring agent according to claim 1, wherein the concentration of the ligand capable of forming chelate complexes is in the range of from 5 to 50% by weight based on the total amount of the hydrophilicity-restoring agent.

6. The hydrophilicity-restoring agent according to claim 1, wherein the hydrophilicity-restoring agent has a viscosity in the range of from 1 to 160 cP at 25° C.

7. The hydrophilicity-restoring agent according to claim 1, wherein the hydrophilicity-restoring agent is for restoring hydrophilicity of a hydrophilic surface having photocatalyst function and hydrophilicity.

8. The hydrophilicity-restoring agent according to claim 1, wherein the hydrophilicity-restoring agent is for a hydrophilic mirror for vehicles.

9. A method for restoring hydrophilicity comprising applying a hydrophilicity-restoring agent which is a gel consisting of a thickener, water, and a dissolved a ligand capable of forming chelate complexes, to a hydrophilic surface with a reduced hydrophilicity and removing the hydrophilicity-restoring agent after an appropriate lapse of time to restore hydrophilicity of the hydrophilic surface.

10. The method according to claim 9, wherein the surface to which the hydrophilicity-restoring agent is applied is covered with a plastic film during the appropriate lapse of time.

11. The method according to claim 9, wherein the hydrophilic surface is one having an organics-decomposing function by a photocatalyst, and wherein the hydrophilicity-restoring agent is removed; then the hydrophilic surface is irradiated with ultraviolet rays for an appropriate period of time to undergo organics decomposition treatment; a hydrophilicity restoration level is observed after the organics decomposition treatment; and if hydrophilicity is not restored to a target level, a series of steps including: application of the hydrophilicity-restoring agent; removal of the hydrophilicity-restoring agent after an appropriate lapse of time; irradiation with ultraviolet rays; and observation of a hydrophilicity restoration level, is repeated until the hydrophilicity is restored to the target level.

12. The method according to claim 9, wherein the ligand capable of forming chelate complexes is at least one ligand selected from the group consisting of ascorbic acid, iminodiacetic acid, ethylenediamine, EDTA, citric acid, gluconic acid, nitrilotriacetic acid, HIDS, malic acid, and phosphoric acid.

13. The method according to claim 9, wherein the thickener is at least one thickener selected from the group consisting of polyethylene glycol, pectin, xanthan gum, potato starch, agar, carrageenan, sodium carboxymethylcellulose, guar gum, locust bean gum, tara gum, glucomannan, psyllium seed gum, tamarind seed gum, gum arabic, arabinogalactan, pullulan, welan gum, enzymatically hydrolyzed guar gum, artemisia sphaerocephala seed gum, gellan gum, dextran, Hibiscus manihot, and levan.

14. The method according to claim 9, wherein the ligand capable of forming chelate complexes is at least one ligand selected from the group consisting of ascorbic acid, iminodiacetic acid, ethylenediamine, EDTA, citric acid, gluconic acid, nitrilotriacetic acid, HIDS, malic acid, and phosphoric acid, and the thickener is at least one thickener selected from the group consisting of polyethylene glycol, pectin, xanthan gum, potato starch, agar, carrageenan, sodium carboxymethylcellulose, guar gum, locust bean gum, tara gum, glucomannan, psyllium seed gum, tamarind seed gum, gum arabic, arabinogalactan, pullulan, welan gum, enzymatically hydrolyzed guar gum, artemisia sphaerocephala seed gum, gellan gum, dextran, Hibiscus manihot, and levan.

15. The method according to claim 9, wherein the concentration of the ligand capable of forming chelate complexes is in the range of from 5 to 50% by weight based on the total amount of the hydrophilicity-restoring agent.

16. The method according to claim 9, wherein the hydrophilicity-restoring agent has a viscosity in the range of from 1 to 160 cP at 25° C.

17. The method according to claim 9, wherein the hydrophilicity-restoring agent is for restoring hydrophilicity of a hydrophilic surface having photocatalyst function and hydrophilicity.

18. The method according to claim 9, wherein the hydrophilicity-restoring agent is for a hydrophilic mirror for vehicles.

19. The hydrophilicity-restoring agent according to claim 1, wherein the concentration of the ligand capable of forming chelate complexes is in the range of from 15 to 40% by weight based on the total amount of the hydrophilicity-restoring agent.

20. The hydrophilicity-restoring agent according to claim 1, wherein the hydrophilicity-restoring agent restores the hydrophilicity of a porous hydrophilic surface having reduced hydrophilicity.

* * * * *